Patented Apr. 24, 1945

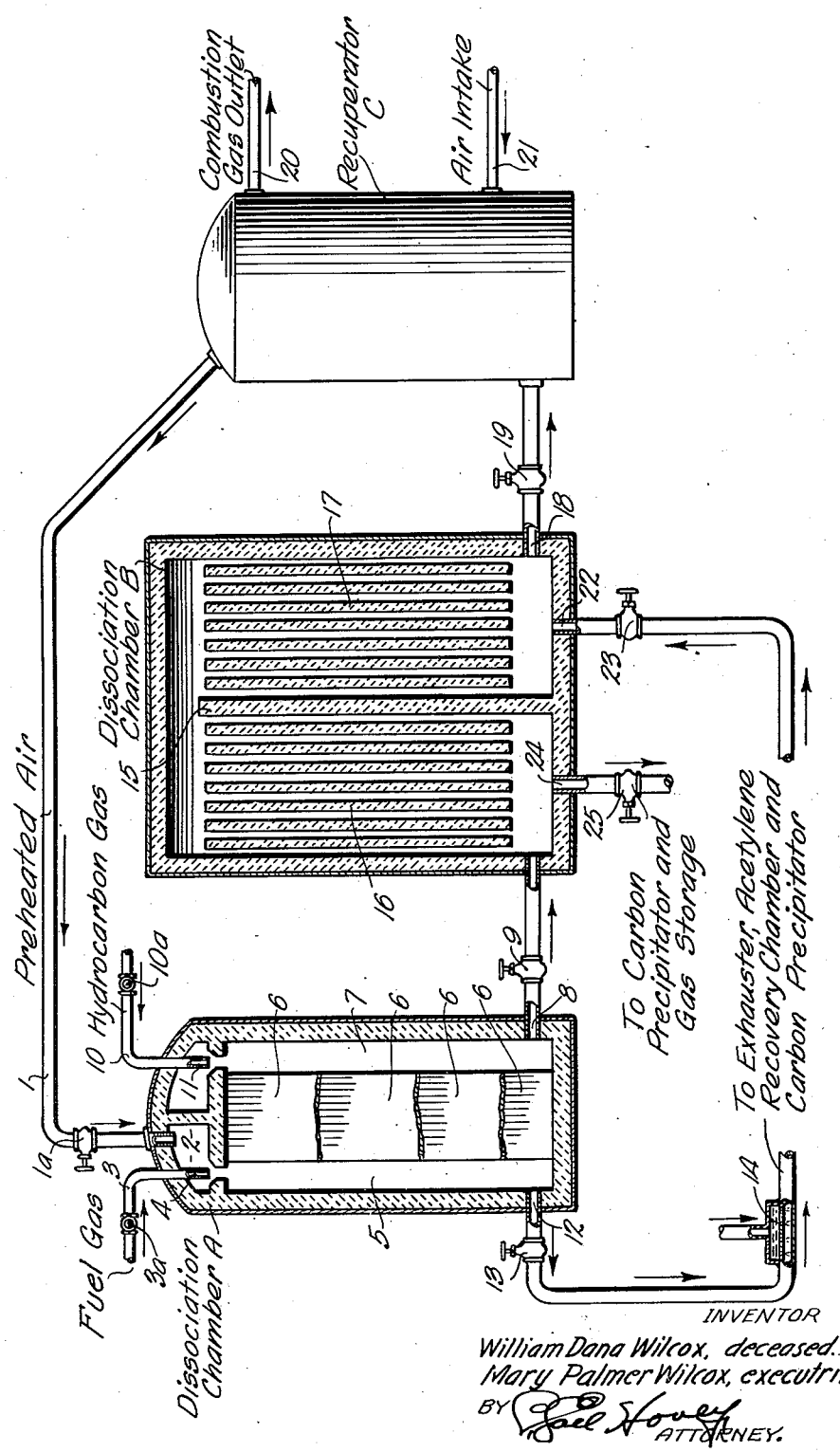

2,374,252

UNITED STATES PATENT OFFICE 2,374,252

APPARATUS FOR THE PRODUCTION OF ACETYLENE AND CARBON BLACK BY THE PYROLYSIS OF HYDROCARBON GASES AND VAPORS

William Dana Wilcox, deceased, late of Enterprise, Fla., by Mary Palmer Wilcox, executrix, Enterprise, Fla., assignor, by mesne assignments, to Oil and Gas Research, Inc., Wilmington, Del., a corporation of Delaware Original application October 4, 1937, Serial No. 167,150. Divided and this application October 18, 1941, Serial No. 415,662

4 Claims. (Cl. 23—277)

This application is a division of co-pending application Serial No. 167,150, filed October 4, 1937, now Patent No. 2,261,319, issued November 4, 1941.

This invention relates to the production of acetylene and carbon black by the pyrolysis of hydrocarbon gases and has for its primary object the provision of effective relatively inexpensive and efficient apparatus for carrying out such production.

A further aim of this invention is the provision of apparatus for the production of acetylene and carbon black, the operation of which will result in obtaining products of high commercial value and quality.

Acetylene is the unstable product of an intermediate reaction in the high temperature pyrolysis of hydrocarbon gases. That no more than a trace appears in coal gas or carburetted water gas, in the production of which hydrocarbon gases are subjected to temperatures at which the formation of acetylene takes place, is due to the rapidity of its polymerization to more complex products, chiefly of the aromatic series, but which may be further changed into tar; and fixed carbon. Substantial recoveries of acetylene have been obtained in experiments carried out under laboratory conditions in which hydrocarbon gases are passed through highly heated tubes of minute diameter and limited length, with the gas subjected to heat for only a very brief interval and rapidly cooled.

But when it has been sought to obtain acetylene on a commercial scale following a similar procedure, the results have been disappointing. As the diameter of the tube is increased, the area of heated surface from which heat is supplied, increases as the diameter; but the volume of gas receiving heat increases as the square of the diameter.

Acetylene is endothermic or heat absorbing in its formation. To convert two cubic feet of methane ($CH_4$) to one cubic foot of acetylene ($C_2H_2$), and three cubic feet of hydrogen ($H_2$)—($2CH_4$ plus heat equals $C_2H_2$ plus $3H_2$) requires first, that the gas be brought to a temperature at which acetylene forms, and that there be put into the gas 430 B. t. u. absorbed or rendered latent in the conversion.

Acetylene may be formed from ethane by scission according to the equation $C_2H_6$ equals $C_2H_2$ plus 4H with the absorption of 363 B. t. u. or, from ethylene according to the equation $C_2H_4$ equals $C_2H_2$ plus 2H with the absorption of 220 B. t. u. A slow heating of hydrocarbon gases extended over a considerable interval of time, other reactions predominate and little acetylene is formed, or where dissociation of the methane is to $CH_2$ and $CH_3$, these fragments may unite forming ethane and ethylene. The more complex hydrocarbons of the paraffin and olefine series may be initially broken up by heat into simpler forms through a rupture of the C—C bond, which, in turn, the input of heat being adequate, may be converted to acetylene. Acetylene being formed with absorption of heat is naturally heat resistant. That is dissociates directly to carbon and hydrogen appears doubtful, but in the reaction $3C_2H_2$ equals $C_6H_6$, 622 B. t. u. are released per cubic foot of benzol formed, and making due allowance for heat disseminated, there is a local rise in temperature which instantly completes the dissociation of the benzol to carbon and hydrogen and imparts to the carbon particles, a high degree of incandescence.

Since the acetylene formed must be withdrawn almost instantly following its formation, it follows that to convert a material portion of the gas to acetylene, the rate of heat input must be very rapid, and this, in turn, requires the largest possible excess of temperature in the source of heat above the temperature of formation and a large total of available heat relative to the volume of gas receiving it. It is not believed that any of the proposed procedures in which acetylene is sought to be produced by the passage of hydrocarbon gases through externally heated tubes can be made commercially operable. Even the most heat resistant alloy steel pipes will not withstand the temperature which it is desirable to employ.

Steel and nickel, the chief materials used in the fabrication of heat resistant pipe, both catalyze dissociation to carbon and hydrogen. Use of refractory pipes is handicapped by their relatively poor conductivity, and the difficulty of making gas-tight connections. The latter difficulty might be overcome, but there is a serious disadvantage in the unavoidable formation of carbon. This, in the beginning, takes place upon the heated interior surface of the pipes and the carbon formed adheres to it. It is evolved from the molecules which, in immediate contact with the surface, have received a charge of heat bringing them to a temperature much above that of the gas as a whole. Later, as the temperature of the gas rises, carbon may form within the body of gas from the dissociation of the benzol formed by polymerization with an evolution of heat. Some of this carbon may be carried forward in the gas, some will be deposited on the interior of the tube. The general verdict of those who have carried out experiments is that carbon, so formed, acts as a catalyst to promote dissociation. In any event, such a deposit seriously cuts down the input of heat through the tube walls.

The proposal of one patentee to do away with the formation of carbon by adding steam to the gas is regarded as entirely impractical. As is well known, the water gas reaction $C$ plus $H_2O$ equals $CO$ plus $H_2$ is highly endothermic or heat absorbing and will, to the extent that it takes place, reduce the temperature within the tube and dissipate the heat introduced in an undesired reaction.

It is evident that dissociation of the hydrocarbon gas cannot be carried to completion; before acetylene can be formed, the methane must be broken up into unstable fragments such as $CH$, $CH_2$ and $CH_3$. Other conditions remaining constant, the rate of formation of these fragments slows down as the total volume of undecomposed methane is reduced. The rate of loss of acetylene by its polymerization, increases as the total volume existing is increased, probably at a progressively increasing rate since polymerization cannot take place except as the molecules of acetylene come in contact with each other.

A point is reached before a complete dissociation of the hydrocarbon gas has taken place, when the loss of acetylene will be more rapid than its formation. The gas must be withdrawn and cooled to a temperature at which acetylene is stable, before this point is reached.

Even with a very brief interval of subjection to heat, more or less carbon will be formed. $CH$ may be dissociated directly to $C$ plus $H$. The total of carbon formed will be much less than where a hydrocarbon gas is completely dissociated by prolonged heating. The concentration of the particles of carbon in the carrying gas will be much less and the time of subjection to heat only a fraction of that required to effect a substantially complete dissociation. A much reduced opportunity exists for the carbon particles, initially almost infinitesimal at the time of release from union with hydrogen, to unite forming larger aggregates. We may expect the carbon, if recovered free from contamination by condensates, to be of a quality comparable to that secured in the method of operation proposed by Szarvasy, in which methane is diluted prior to its pyrolysis by the addition of several times its volume of inert gases, such as hydrogen or nitrogen.

This carbon, if recovered, will be a finely divided pigment, highly valuable for use in the rubber industries and the return from its sale will assist materially in making the process pay its way.

Where the pyrolysis of the hydrocarbon gas is effected by its passage through a chamber filled with refractory heat absorbing masses brought to a very high temperature by a periodic internal combustion of fuel gas, supported by highly preheated air, temperatures in the heat source may be created up to 3000° F., or higher. Where such temperatures are employed, the most highly heat resistant refractories must be used. Silicon carbide or carborundum is resistant to temperatures up to 3600° F., and has the further desirable quality of conducting heat at a rate seven or eight times as rapidly as ordinary fire brick, so that the heat received in the reheating cycle of operation is carried rapidly to the center of the mass and will pass rapidly to the surface as the temperature is reduced by reason of heat imparted to the gas during the make cycle.

Where the carbon evolved is to be recovered as one of the products of operation, the refractory filling, which is the means of heat transfer, will preferably be placed so as to form slots or flues, all the exposed surfaces of which, with which the gas comes in contact, are parallel with the direction of gas flow and constantly swept by the current of gas and which provide no surfaces such as exist where a checker brick filling is employed, protected from the force of the current on which the carbon can settle out. This construction is covered in the applicant's U. S. Patent 1,916,545.

Using such flues in the filling of the dissociation chamber, a larger proportion of the carbon formed is carried forward in the gas and may be recovered. Some carbon remains adherent to the surfaces but it is burned off in the following reheating cycle and does not so accumulate as to interfere with operation.

An earlier inventor proposes to obtain acetylene by the passage of hydrocarbon gases through a bed of small particles of carborundum approximately a quarter of an inch in diameter, prior heated, to around 2700° F. This bed of small particles provides a large contact surface relative to the volume of gas which can be present in the interstices in any interval of time and is in this respect efficient in effecting a rapid transfer of heat into the gas. But the heat storage is small and the length of the make cycle is limited to a few seconds. The interstices are so small, that there is considerable back pressure requiring a pressure upon the gas in order to force its passage which causes a more rapid polymerization. Substantially all of the carbon evolved is filtered out, and cannot be recovered. In any cyclic operation carried out on a commercial scale involving the closing and opening of valves of substantial size, it is important that the ratio of heat stored to the area of exposed surface and volume of gas passed be such as to permit of operating cycles of several minutes in length without such a reduction in temperature as reduces the rate of the reaction desired.

This has been carefully kept in mind in the design of apparatus shown by the accompanying drawing. The applicant's pending application, No. 735,442, directed to obtaining similar results, discloses a similar procedure for heating the gas, means for effecting a rapid cooling at the outlet from the dissociation chamber by spraying water into the gas; a method of recovering the entrained carbon, a novel method of maintaining a pressure less than atmospheric upon the gas during the make cycle, and a process of recovering the acetylene.

It has been, in this specification, found advisable to reduce somewhat the distance of travel of the gas in contact with heated surfaces and, combined with the operation of the dissociation chamber employed in the production of acetylene, the operation of a dissociation chamber has been disclosed in which the residual gas, after recovery of the acetylene, containing a considerable percentage of hydrocarbon gas but predominantly hydrogen, is further pyrolyzed to recover carbon black and a final residue which will be very nearly a pure hydrogen.

The gain in operating results by this combination is substantial. In heating the dissociation chamber in which acetylene is to be produced to a temperature approaching 3000° F., which is regarded as highly desirable although good results may be obtainable at temperatures in the refractory walls of 2500° F. upward, it is evident that the heating gases will pass from the chamber at temperatures above those which it is sought to create. The sensible heat in these gases of combustion is greatly in excess of that required to preheat the air which supports their combustion.

They are passed from the outlet of the acetylene chamber into and through a dissociating unit such as disclosed in and covered by the applicant's U. S. Patent No. 1,916,545. They pass up through the dissociating chamber down through a preheating chamber and thence through a heat exchanger of the recuperator type in which the air which supports the combustion of the fuel gas is brought to a temperature preferably in excess of 1000° F. prior to its use in heating the chamber in which acetylene is formed. The residual gas from which the acetylene has been recovered will contain from 20 to 30% of methane; the remainder except for quite small percentages of nitrogen and carbon monoxide will be hydrogen. It is well established that the addition to methane, prior to heating it for the recovery of carbon black, of three or more volumes of inert gas as proposed by Szarvasy, results in a very great improvement in the quality of the carbon black recovered. The reduced concentration of the carbon effects a great reduction in the number of contacts which the particles of carbon can make with each other prior to the withdrawal and cooling of the gas. The product is much more finely divided, is darker in color and, when added to rubber, imparts a much greater increase of tensile strength than results where the carbon black obtained in a similar dissociation of an undiluted hydrocarbon gas is employed. This carbon black has the further merit of causing a much less stiffening effect than where the product known as channel process black is employed, and hence may be given the preference, where it is desired to retain flexibility.

During the make cycle, hydrocarbon gas either undiluted or, in part, of recirculated gas—is passing through the first dissociation chamber for the production primarily of acetylene; coincidentally, the excess of residual gas too lean to repay further pyrolysis for the recovery of acetylene, is passed through the second dissociation chamber and is there completely decomposed into carbon and hydrogen. This recovery of the potential value in the residue gas by means of the excess heat in the gas employed to heat the dissociation chamber in which acetylene is formed effects a very material increase in the net value created in operation and, if a way exists to utilize the substantially pure hydrogen which is the final residual, as in the hydrogenation of oil or in the synthesis of ammonia, the process as a whole may be highly profitable in operation although the volume of acetylene produced be of and by itself inadequate to repay the entire cost of the procedure.

It has been known since the days of Berthelot, that when hydrocarbon gases are subjected to a high temperature as by passage through a hot tube, acetylene is one of the products formed. What Berthelot discovered and published to the world over three-quarters of a century ago has been from time to time confirmed by the experiments of others. Numerous patents have been granted, but none of the procedures in these procedures have come into commercial use, with the exception of those in which hydrocarbon gases are passed through the flame of an electric arc.

The applicant's work has been directed to the creation of conditions more favorable to the formation and recovery of acetylene and to the provision of practicable means for creating and maintaining these conditions. What has been set out in the foregoing may be made more clear by reference to the accompanying drawing.

A, as shown in the drawing is a vertical cross-section of the chamber in which a pyrolysis directed to the recovery of acetylene as the major product is carried out. It is preferably rectangular in form, enclosed in refractory walls well insulated to prevent the escape of heat, and further enclosed in a gas-tight steel jacket. I is the pipe bringing highly preheated air from recuperator C and discharging it into hot air flue 2. In the heating cycle of operation, fuel gas brought through pipe 3 is added to the air through a series of smaller pipes 4, extending along the length of 3, of which one only is shown.

The hydrogen residual gas may be used as the fuel and burned with air at perhaps 1000° F., and creates a very high flame temperature. The interior lining of the enclosing walls of A and the central filling 6 which, in the absence of a specific descriptive name, I elect to call the diaphragm, will preferably be of silicon carbide brick. The hot combustion gases pass down through open space 5 and thence through the slots in 6. 6 is built up of a series of narrow walls extending from 5 to 7, formed by setting brick on edge with narrow spaces or slots between each wall, preferably around one-half of an inch wide. The walls may be formed of brick laid up on their sides in which event, the spaces between them may be somewhat wider. The combustion gases pass through the slots into 7, and thence through outlet 8, closable by valve 9, into B.

In the make cycle of operation following a bringing of the brick in 6 to temperatures within the range 2500° F. to 3000° F., and possibly higher, valve 9 is closed and valve 13 on outlet 12 is opened. Hydrocarbon containing gas is introduced through 10 and admitted to 7 through a number of smaller inlets, 11, extending along the length of 10, of which one only is shown. The gas passes through the slots in 6, into 5, and thence through outlet 12. Enough water is sprayed into the issuing gas through a series of small jets 14 to cool the gas to a temperature under 700° F., at which acetylene is stable. The gas passes to accessory apparatus not shown, for the recovery of entrained carbon and of the acetylene formed.

The general rule is that a reduction in pressure accelerates reactions such as $2CH_4$ equals $C_2H_2$ plus $3H_2$, which are accompanied by an increase of volume and retards reactions which like $3C_2H_2$ equals $C_6H_6$ are accompanied by a decrease of volume. The lowering of partial pressures may be effected in part by dilution of the hydrocarbon gas but the maintenance of a high velocity of flow through 6 with a very short time of subjection to heat requires a substantial differential between inlet and outlet pressure, best effected by the employment of an exhauster upon outlet 12.

The gain in percentage of acetylene recovery by the employment of pressures less than atmospheric within the dissociation is, no doubt, in part due to the diminished number of contacts which the acetylene molecules can make with each other in unit time precedent to their polymerization, and a part must be credited to the fact that less gas being present within the heated zone, the input of heat into the gas from any given source will be greater per unit of gas.

The heat storage of walls 2½ inches in width, is sufficient to permit make cycles of from 5 to 10 minutes in length, but the optimum length of the cycles will increase with the temperature of heating and the degree of vacuum and diminish with increase in the velocity of throughput. The optimum length of the cycle as well as the temperature velocity and degree of vacuum can, for any plant, be determined only by operative tests.

It may be stated with certainty, however, that the initial temperature to which the diaphragm walls will be heated will exceed 2500° F., that the distance of travel of the gas through the diaphragm, as determined by the width, will not exceed five feet and will preferably be around three, that the gas will be passed through under a pressure upon the hydrocarbon gas less than atmospheric secured either by dilution of the gas or by the operation of an exhauster and that the time of passage through the slots will be substantially less than a second.

The fact that the slot walls in the second dissociation chamber are parallel with the general direction of gas flow and are constantly swept by the current of gas is a condition favorable to an increase in the proportion of the carbon evolved which is carried out entrained in the gas, and may be recovered. This form of construction first disclosed in the inventor's U. S. Patent No. 1,916,545, and covered in claims 10, 11, and 12, is regarded as contributing materially to the possibility of profitable operation. The combustion gases entering B pass up the dissociation chamber 16 filled with a multiplicity of refractory walled slots; pass over dividing wall 15 and down through preheating chamber 17, through outlet 18, closable by valve 19, and through recuperator C, being discharged to the air through 20 after heating the air passed into C through 21, and withdrawn through 1.

During the make cycle of operation in A, the scrubbed gas from which the carbon and acetylene have been recovered containing from 20 to 35% of hydrocarbon gas, chiefly methane, is passed into chamber B through 22 into the base of 17, valves 9 and 19 being closed. It is passed up through 17 and down 16, which has been heated to a temperature of around 2500° F., in its lower portion. The gas is completely decomposed to carbon and hydrogen. It passes out through outlet 24 closable during the reheating cycle by valve 25, and the finely divided carbon carried out in the gas is recovered in suitable apparatus not shown. There are valves 1a, 3a, and 10a on 1, 3 and 10 respectively which permit of their being closed. The simultaneous heating of A and B by combustion gases passed through them in series and the coincident dissociations which take place during the make cycle of operation effect a substantial improvement in the efficiency with which the combustion gases are employed, and a most complete utilization of the hydrocarbon gas in the production of products having maximum value.

Having thus described the invention, what is claimd as new and desired to be secured by Letters Patent is:

1. In an apparatus for the production of acetylene and carbon black by the pyrolysis of hydrocarbon gases, first and second dissociation chambers, the first chamber having an inlet communicating with a supply of gas to be decomposed and inlets communicating with sources of fuel gases and air at its upper end and an outlet at its lower end; a vertical partition extending from top to bottom of the first chamber and between said first inlet and the outlet, said partition having a plurality of slots or passages through which gases traversing the chamber must pass; a vertical partition in the second chamber dividing the same into two intercommunicating compartments; a plurality of spaced vertical walls in each compartment, said walls forming a refractory filler structure and defining a plurality of narrow passages through which gases traversing the compartments must pass; an inlet and outlet for one of said compartments; an outlet for the other of said compartments; a conduit interconnecting lower portions of the first dissociation chamber with the lower portion of the second dissociation chamber; and valves controlling the flow of gases through the conduit and said inlets and outlets.

2. An apparatus for the production of acetylene and carbon black by the pyrolysis of hydrocarbon gases comprising a dissociation chamber having a vertical partition formed with a plurality of narrow slots or passages, adjacent inlets in the upper end of the chamber and at one side of the partition communicating with a supply of fuel gases and with a source of preheated air, an inlet in the upper end of the chamber at the other side of the partition communicating with a supply of gas to be decomposed, an outlet in the lower end of the chamber and at the same side of the partition as the adjacent inlets, a second dissociation chamber having a dividing wall spaced from its upper end and forming spaced compartments, filler structure in each compartment spaced from the upper and lower chamber walls and providing narrow passages therethrough, an inlet and outlet for one compartment, an outlet for the other compartment, a conduit interconnecting the lower portions of the chambers, and valves in the conduit inlets and outlets for controlling the flow of gases therethrough.

3. The apparatus of claim 2 wherein the filler structure comprises spaced apart parallel vertical walls.

4. In an apparatus for the production of carbon black, first and second dissociation chambers; means for admitting a gas to be decomposed into the first chamber; pipes communicating with sources of supply of fuel gas and air leading into said first chamber; outlets for said first chamber at a point remote from said pipes; a partition in said first chamber having a plurality of slots or passages through which gases traversing the chamber pass; a partition in the second chamber dividing the same into two intercommunicating compartments; a plurality of spacing walls in each compartment, said walls forming a refractory filler structure and defining a plurality of narrow passages through which gases traversing the compartments pass; inlets and outlets for said compartments; a conduit connecting an outlet of the first dissociation chamber with the inlet of one compartment in the second dissociation chamber; and valves controlling the flow of gases through the conduit and said inlets and outlets.

MARY PALMER WILCOX,
*Executrix of the Estate of William Dana Wilcox, Deceased.*